Figure 1:
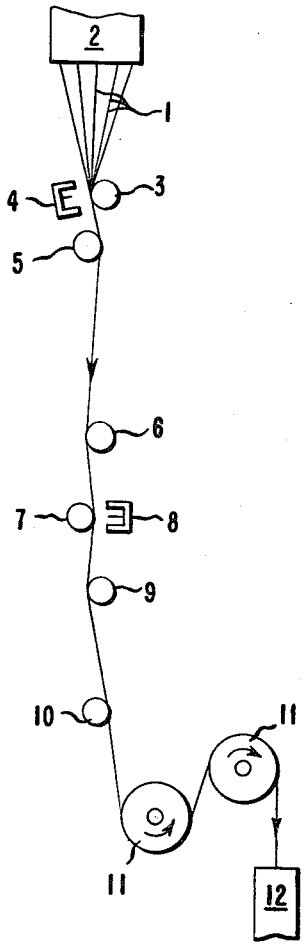
Figure 2:
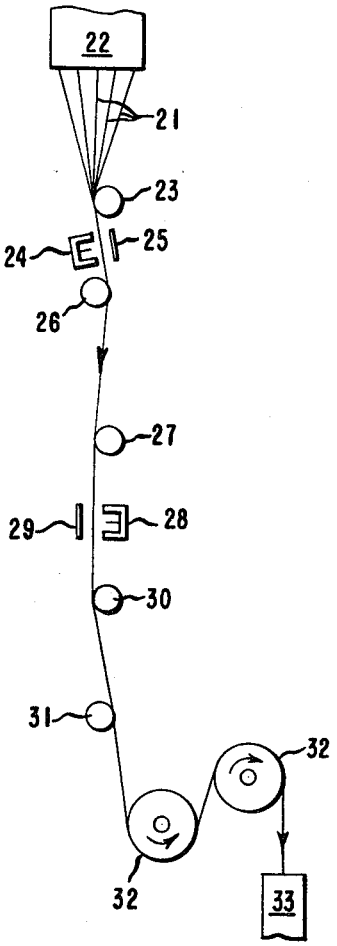

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 10, 1970

871 O.G. 353

T871,003
SPINNING METHOD

Samir C. Debbas, Madison, Tenn., assignor to E. I. du Pont de Nemours and Company, Wilmington, Del., a corporation of Delaware

Filed May 20, 1969, Ser. No. 826,183
Int. B28b *3/20*
U.S. Cl. 264—22
1 Sheet Drawing. 10 Pages Specification

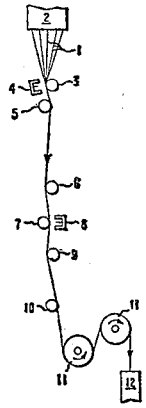

A method for improving the distribution of binder and matrix filaments used in the preparation of nonwoven webs. The binder and matrix filaments are spun from the same spinneret through orifices grouped to provide uniform distribution of the filaments, and then charged at two separate locations along their path of travel. The charge imparted at the first of such locations is at least 50 percent of the total charge applied to the filaments. The filaments are passed over a guide positioned between the two charging locations. The guide has a concave surface contacting the filaments which preferably has a radius of curvature in the range of from about 18 to about 30 inches.

Feb. 10, 1970 S. C. DEBBAS T871,003

SPINNING METHOD

Filed May 20, 1969

INVENTOR

SAMIR C. DEBBAS

BY Howard P. West Jr.

ATTORNEY